(12) United States Patent
Obata

(10) Patent No.: US 8,295,895 B2
(45) Date of Patent: Oct. 23, 2012

(54) PORTABLE ELECTRONIC DEVICE

(75) Inventor: Takanori Obata, Osaka (JP)

(73) Assignee: KYOCERA Corporation, Kyoto (JP)

( * ) Notice: Subject to any disclaimer, the term of this patent is extended or adjusted under 35 U.S.C. 154(b) by 209 days.

(21) Appl. No.: 12/678,803

(22) PCT Filed: Sep. 26, 2008

(86) PCT No.: PCT/JP2008/067478
§ 371 (c)(1),
(2), (4) Date: Mar. 18, 2010

(87) PCT Pub. No.: WO2009/041608

PCT Pub. Date: Apr. 2, 2009

(65) Prior Publication Data
US 2010/0210325 A1      Aug. 19, 2010

(30) Foreign Application Priority Data

Sep. 27, 2007   (JP) ................. 2007-250759

(51) Int. Cl.
*H04W 88/02* (2009.01)
(52) U.S. Cl. .................. 455/575.1; 455/90.1; 455/550.1
(58) Field of Classification Search ............. 455/575.1, 455/90.1, 550.1, 556.1–2; 396/25–29, 281, 396/283
See application file for complete search history.

(56) References Cited

U.S. PATENT DOCUMENTS

| | | | |
|---|---|---|---|
| 7,495,700 B2 * | 2/2009 | Watanabe | 348/239 |
| 2003/0013484 A1 * | 1/2003 | Nishimura et al. | 455/556 |
| 2005/0286883 A1 * | 12/2005 | Abe et al. | 396/266 |
| 2006/0280494 A1 * | 12/2006 | Tosa | 396/281 |
| 2007/0177520 A1 | 8/2007 | Morinaga et al. | |
| 2007/0254697 A1 * | 11/2007 | Sugio et al. | 455/556.2 |
| 2007/0292118 A1 * | 12/2007 | TR FF | 396/25 |
| 2011/0105100 A1 * | 5/2011 | Tanaka et al. | 455/418 |

FOREIGN PATENT DOCUMENTS

| | | |
|---|---|---|
| JP | 2003-186093 A | 3/2003 |
| JP | 2004-336508 | 2/2004 |
| JP | 2005-328224 | 4/2005 |
| JP | 2006-319550 A | 11/2006 |
| JP | 2007-208327 | 8/2007 |
| JP | 2007-208627 A | 8/2007 |
| JP | 2008-236173 A | 2/2008 |

OTHER PUBLICATIONS

Notification of Reasons for Rejection dated Nov. 22, 2011, issued in counterpart Japanese Application No. 2009-534417.

* cited by examiner

*Primary Examiner* — Cong Tran
(74) *Attorney, Agent, or Firm* — Procopio, Cory, Hargreaves & Savitch LLP

(57) ABSTRACT

One embodiment of the portable electronic device according to the present invention includes a housing provided with a camera 6 to enable image capture. In the housing, arranged are a pressure sensor 5 for detecting that the housing is in a submerged state, a speaker 3 for emitting shutter sound at the time of photographing using the camera 6, and a control circuit 1 for controlling an operation of the speaker 3. When the pressure sensor 5 detects that the housing is in the submerged state, the control circuit 1 increases volume of the shutter sound emitted from the speaker 3.

14 Claims, 3 Drawing Sheets

PORTABLE ELECTRONIC DEVICE

CROSS REFERENCE TO RELATED APPLICATIONS

This application is the U.S. National Stage application of PCT application PCT/JP2008/067478 filed on Sep. 26, 2008, which claims priority under 35 U.S.C. §119 to Japanese Patent Application No. 2007-250759 filed on Sep. 27, 2007, and the contents of each of these applications are incorporated herein by reference in their entirety.

FIELD OF THE INVENTION

The present invention relates to portable electronic devices having a photographing function, such as a portable telephone with camera, digital camera, or the like.

BACKGROUND

In recent years a portable telephone includes a small housing provided with a camera, and is capable of not only telephonic communication but also photographing using the camera.

Also, to the portable telephone, applied is a waterproofing measure which provides enough function in daily use situation and, in some cases, provides a waterproofing effect even at a depth of about one to several meters, and therefore, some portable telephones with camera can photograph in water.

Meanwhile, it has been proposed that when a photographing environment of a digital camera changes from on the land to underwater a photographing condition suitable for underwater photography is set automatically.

This also enables underwater photography with a high image quality by a portable telephone with camera by automatically setting the photographing condition suitable for underwater photography when the photographing environment changes from on the land to underwater.

SUMMARY OF THE INVENTION

However, since third person is hard to notice that photographing is conducted in water with the portable telephone with camera or digital camera, surreptitious photographing might be possible.

Therefore, an object of the present invention is to provide a portable electronic device which can prevent misuse thereof such as surreptitious photographing in water effectively.

A portable electronic device according to the present invention includes a housing provided with a camera to enable image capture. The housing includes a submergence detecting unit configured to detect that the housing is in a submerged state, a unit configured to operate at the time of photographing that emits sound or light at the time of photographing using the camera, and a control unit configured to control an operation of the unit configured to operate at the time of photographing arranged therein. The device is characterized in that when the submergence detecting unit detects that the housing is in the submerged state, the control unit switches the unit configured to operate at the time of photographing from a normal operation in a non-submerged state to a non-normal operation for notifying people around of the photographing in the submerged state.

With the portable electronic device of the present invention described above, when it is detected that the housing is in the submerged state at the time of photographing using the camera, the unit configured to operate at the time of photographing is switched from the normal operation in the non-submerged state to the non-normal operation for notifying the people around of the photographing in the submerged state, and the people around are notified of the photographing in the submerged state by means of a change in sound or light emitted from the unit configured to operate at the time of photographing. As a result, sense of discipline will come into play against conducting underwater photography for the purpose of surreptitious photographing.

Also, a portable electronic device according to the present invention includes a housing provided with a camera to enable image capture. The housing includes a submergence detecting unit configured to detect that the housing is in a submerged state, a unit configured to operate at the time of photographing that emits sound or light at the time of photographing using the camera, and a control unit configured to control an operation of the unit configured to operate at the time of photographing arranged therein. The device is characterized in that when the submergence detecting unit detects that the housing is in the submerged state and a ratio of flesh-color part in a photographic subject exceeds a predetermined value, the control unit switches the unit configured to operate at the time of photographing from a normal operation in a non-submerged state to a non-normal operation for notifying people around of the photographing in the submerged state.

With the portable electronic device of the present invention described above, when it is detected that the housing is in the submerged state at the time of photographing using the camera and the ratio of flesh-color part in the photographic subject exceeds the predetermined value, the unit configured to operate at the time of photographing is switched from the normal operation in the non-submerged state to the non-normal operation for notifying the people around of the photographing in the submerged state.

Therefore, in the case of photographing a person in water, the unit configured to operate at the time of photographing is switched from the normal operation to the non-normal operation, and the people around are notified of the photographing in the submerged state by means of a change in sound or light emitted from the unit configured to operate at the time of photographing. As a result, sense of discipline will come into play against conducting underwater photography for the purpose of surreptitious photographing.

In a particular configuration, the unit configured to operate at the time of photographing is a speaker which emits sound at the time of photographing using the camera.

The control unit makes shutter sound generated from the speaker at the time of photographing using the camera, and sets greater sound volume in the non-normal operation than in the normal operation.

Alternatively, the control unit makes voice announcing the photographing generated from the speaker at the time of photographing using the camera in the submerged state.

With this particular configuration, at the time of photographing in water, the very loud shutter sound or the voice announcing the photographing is generated from the speaker, and therefore, the people around are notified of the photographing in the submerged state by means of such sound.

In another particular configuration, the unit configured to operate at the time of photographing is a flashlight to be emitted at the time of photographing using the camera.

The control unit forces the flashlight to be emitted in the non-normal operation.

With this particular configuration, at the time of photographing in water, the flashlight is forcibly emitted, and therefore, the people around are notified of the photographing in the submerged state by means of such light.

In a further particular configuration, a plurality of colors are set as the flesh-color.

With this particular configuration, since the plurality of colors can be set as the flesh-color of the photographic subject, it is possible to accurately detect whether or not photographing of a person has been conducted, thereby enabling switching operation to the non-normal operation more appropriately.

With the portable electronic device according to the present invention, at the time of photographing in the submerged state, the people around are notified of the photographing by means of sound or light, and therefore, it is possible to effectively prevent misuse such as surreptitious photographing in water.

DETAILED DESCRIPTION

An embodiment in which a portable electronic device according to the present invention is implemented in a portable telephone will be specifically described below with reference to the drawings.

Figure 1:
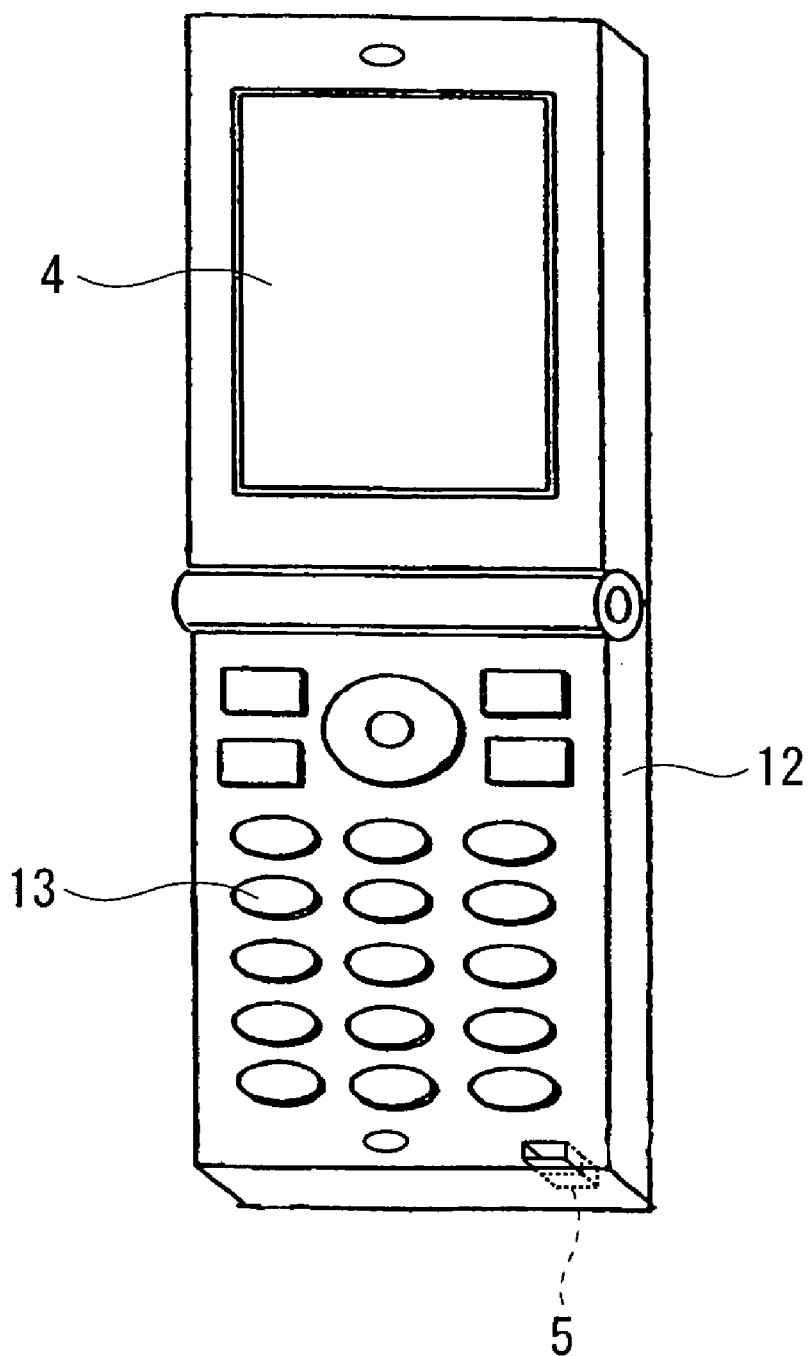
FIG. 1 is a front view of a portable telephone which is one embodiment of a portable electronic device according to the present invention.
Figure 2:
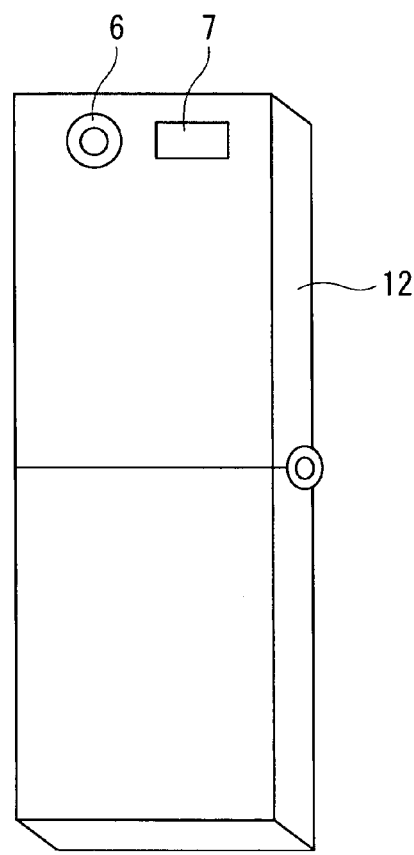
FIG. 2 is a rear view of the portable telephone which is one embodiment of the portable electronic device according to the present invention.

As shown in FIG. 1, the portable telephone of the embodiment of the portable electronic device according to the present invention includes a foldable housing 12 provided with a display 4 and a plurality of operation keys 13 arranged therein. At an end portion of the housing 12, a pressure sensor 5 for detecting whether or not the housing 12 is in a submerged state is installed at a slightly recessed position from a surface of the housing 12. Also, as shown in FIG. 2, a camera 6 and a flashlight 7 for photography are arranged on a rear surface of the housing 12.

Figure 3:
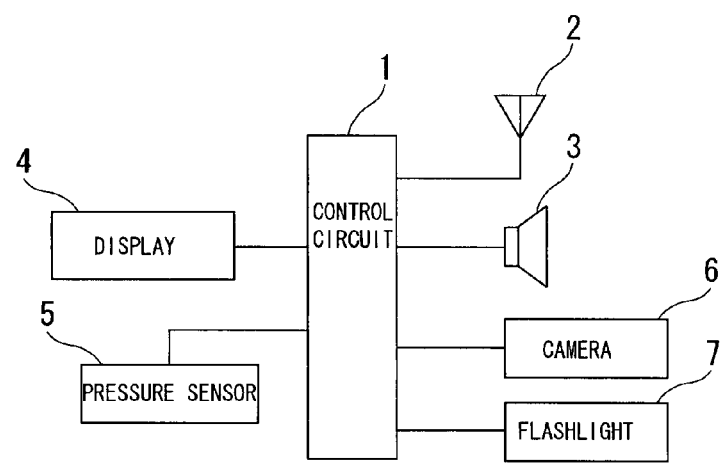
FIG. 3 is a block diagram for showing an electrical configuration of the portable telephone which is one embodiment of the portable electronic device according to the present invention.

FIG. 3 shows an electrical configuration of the portable telephone described above. To a control circuit 1 comprising a micro computer or the like, connected are an antenna 2 for telephonic communication, a speaker 3 which is to be a telephone receiver part, said display 4, pressure sensor 5, camera 6 and flashlight 7.

Figure 4:
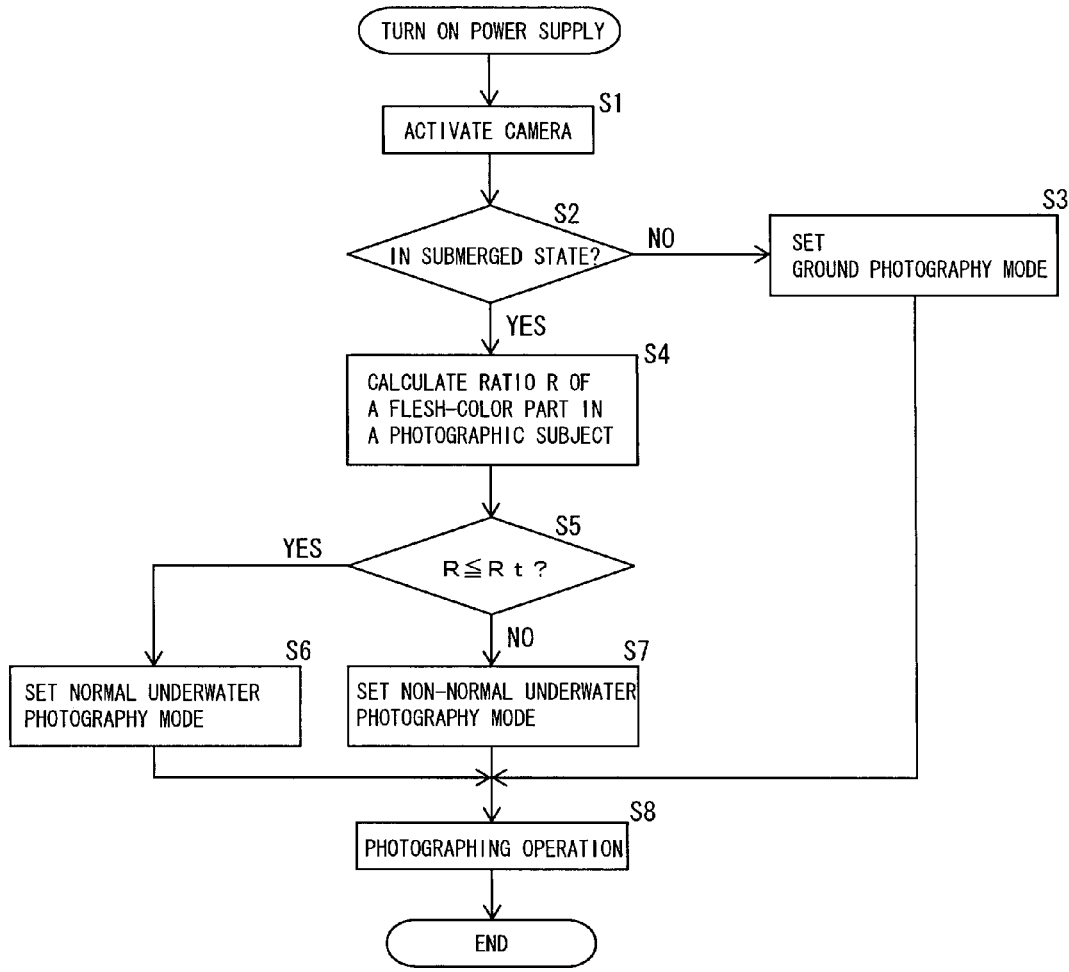
FIG. 4 is a flow chart showing a control procedure at the time of photographing of the portable telephone which is one embodiment of the portable electronic device according to the present invention.

FIG. 4 shows a control procedure at the time of photographing of the portable telephone described above. The operation in each step shown in FIG. 4 is realized by collaboration of the control circuit 1 shown in FIG. 3 with a program stored in a memory or the like.

When a power supply is turned on, first in step S1, the camera is activated, and in step S2, it is determined based on a detective signal of said pressure sensor 5 whether or not a state of the housing 12 is a submerged state. If pressure detected by the pressure sensor 5 is atmospheric pressure, it is determined that the state of the housing 12 is not the submerged state, while, if the pressure is higher than the atmospheric pressure, it is determined that the state of the housing 12 is the submerged state.

If it is determined that the state of the housing 12 is not the submerged state in step S2, the flow proceeds to step S3, and a ground photography mode is set. In particular, set is a photographing condition suitable for photography on the ground along with a normal shutter sound and flash operation that should be generated at the time of photographing on the ground. Thereafter, the flow proceeds to step S8, and a photographing operation is conducted.

In contrast, if it is determined that the state of the housing 12 is the submerged state in step S2, the flow proceeds to step S4, and a ratio R of a flesh-color part in a photographic subject is calculated, and then in step S5, it is determined whether or not the ratio R is equal to or lower than a predetermined value Rt. Here, the predetermined value Rt is previously set in proportion to the ratio of the flesh-color part obtained when photographing of a person.

If it is determined YES in step S5, the flow proceeds to step S6, and a normal underwater photography mode is set. In particular, set is a photographing condition suitable for underwater photography along with generation of the shutter sound with normal volume and the flash operation.

In contrast, if it is determined NO in step S5, the flow proceeds to step S7, and a non-normal photography mode is set. In particular, set is a photographing condition suitable for underwater photography along with generation of the shutter sound with greater volume than normal and forced flash operation.

Thereafter, the flow proceeds to step S8, and the photographing operation is conducted.

With the portable telephone described above, in the case where it is determined that it is underwater photography and the photographic subject is a person, the shutter sound with greater volume than normal is generated and the flashlight is forcibly emitted to notify the people around of the photographing in water. Therefore, it is possible to effectively prevent misuse such as surreptitious photographing in water.

The present invention is not limited to the foregoing embodiment in construction but can be modified variously within the technical range set forth in the claims. For example, at the time of photographing in water, not limited to both of the generation of the shutter sound with greater volume than normal and the forced flash operation, it is possible to set either one of the operations. Also, it is possible to generate a voice announcing the photographing such as "Photographing has been conducted" or the like instead of the generation of the shutter sound with greater volume than normal. Further, it is effective to employ a sound or light having a wavelength which is propagated in water without great attenuation for the sound or light to be generated at the time of photographing in water.

Also, in the embodiment described above, the atmospheric pressure is used as a standard for determination of whether or not it is in the submerged state by the pressure sensor 5 in step S2 of FIG. 4. However, the portable electronic device according to the present invention is not limited to such a configuration, and it is also possible to employ a value other than the atmospheric pressure arbitrarily.

Moreover, in the embodiment described above, the ratio R of the flesh-color part in a photographic subject is calculated in step S4 of FIG. 4. Here, the portable electronic device according to the present invention does not limit the flesh-color used in the calculation to a specific color. That is, in step S4 shown in FIG. 4, the ratio R of the flesh-color part is calculated in order to detect that photographing of a person is conducted. Therefore, it is possible to set any arbitrary color as said flesh-color based on each region, environment or the like. For example, it is possible to set an arbitrary color such as flesh, light orange, pale orange, peach or the like.

Further, with the portable electronic device according to the present invention, it is also possible to set a plurality of colors as said flesh-color, for example. In such a case, it is possible to conduct more appropriately the determination of whether or not photographing of a person in the submerged state is being conducted.

Also, in the embodiment described above, the non-normal underwater photography mode (non-normal operation) is set in step S7 of FIG. 4. The operation in this non-normal underwater photography mode can be any operation as long as that notifies the people around of the photographing in water. For example, operations such as a plurality of flash operations may be combined, and the operation is not limited to the operations discussed in the embodiment described above.

In addition, the water where the portable electronic device according to the present invention is submerged is not limited to a particular water, and it may be any water such as in a bath, a swimming pool, a river, the sea or the like.

Furthermore, with the portable electronic device according to the present invention, the submerged state is not limited to a state where the entire housing is in water, but includes a state where a part of the housing is in water.

Further, in the embodiment described above, it is determined whether or not it is in the submerged state based on the pressure detected by the pressure sensor. However, in the portable electronic device according to the present invention, not limited to the submergence detecting unit such as the pressure sensor, another arbitrary submergence detecting unit may be employed such as, for example, a sensor for detecting a change in an electrical continuity state due to submergence, a unit configured to detect a change in characteristics of a material whose characteristics change due to submergence (for example, a unit configured to detect a change in reflectivity of a material used because the optical reflectivity thereof changes due to submergence) or the like.

Furthermore, in the embodiment described above, the ratio R of the flesh-color part in a photographic subject is calculated in step S4 and step S5 shown in FIG. 4. However, in the portable electronic device according to the present invention, it is also possible to omit such a process of calculating the ratio of the flesh-color part. That is, it is possible that the portable electronic device according to the present invention detects the submerged state in step S2, and thereafter, the flow proceeds to the non-normal underwater photography mode in step S7 shown in FIG. 4, skipping step S4 and step S5.

The disclosure of Japanese application Number 2007-250759, upon which the present application is based for claiming priority, is incorporated in the disclosure of the present application by reference.

The invention claimed is:

1. A portable electronic device including a housing provided with a camera to enable image capture,
the housing including a submergence detecting unit configured to detect that the housing is in a submerged state, an operation unit configured to operate at the time of photographing that emits sound or visible light at the time of photographing using the camera, and a control unit configured to control an operation of the unit configured to operate at the time of photographing,
the portable electronic device being characterized in that:
when the submergence detecting unit detects at said time of photographing using the camera that the housing is in the submerged state, the control unit switches said operation unit from a normal operation in a non-submerged state to a non-normal operation for notifying people around of the photographing in the submerged state, by causing said operation unit to emit sound or visible light.

2. A portable electronic device including a housing provided with a camera to enable image capture, the housing including a submergence detecting unit configured to detect that the housing is in a submerged state, an operation unit configured to operate at the time of photographing that emits sound or visible light at the time of photographing using the camera, and a control unit configured to control an operation of the operation unit configured to operate at the time of photographing arranged therein, the portable electronic device being characterized in that when the submergence detecting unit detects that the housing is in the submerged state and a ratio of flesh-color part in a photographic subject exceeds a predetermined value, the control unit switches the operation unit configured to operate at the time of photographing from a normal operation in a non-submerged state to a non-normal operation for notifying people around of the photographing in the submerged state.

3. The portable electronic device according to claim 1, wherein the operation unit configured to operate at the time of photographing is a speaker which emits sound at the time of photographing using the camera.

4. The portable electronic device according to claim 2, wherein the operation unit configured to operate at the time of photographing is a speaker which emits sound at the time of photographing using the camera.

5. The portable electronic device according to claim 3, wherein the control unit makes shutter sound generated from the speaker at the time of photographing using the camera, and sets greater sound volume in the non-normal operation than in the normal operation.

6. The portable electronic device according to claim 4, wherein the control unit makes shutter sound generated from the speaker at the time of photographing using the camera, and sets greater sound volume in the non-normal operation than in the normal operation.

7. The portable electronic device according to claim 3, wherein the control unit makes voice announcing the photographing generated from the speaker at the time of photographing using the camera in the submerged state.

8. The portable electronic device according to claim 4, wherein the control unit makes voice announcing the photographing generated from the speaker at the time of photographing using the camera in the submerged state.

9. The portable electronic device according to claim 1, wherein the operation unit configured to operate at the time of photographing is a flashlight to be emitted at the time of photographing using the camera.

10. The portable electronic device according to claim 2, wherein the operation unit configured to operate at the time of photographing is a flashlight to be emitted at the time of photographing using the camera.

11. The portable electronic device according to claim 9, wherein the control unit forces the flashlight to be emitted in the non-normal operation.

12. The portable electronic device according to claim 10, wherein the control unit forces the flashlight to be emitted in the non-normal operation.

13. The portable electronic device according to claim 2, wherein a plurality of colors are set as the flesh-color.

14. A portable electronic device including a housing provided with a camera to enable image capture, the housing including submergence detecting means for detecting that the housing is in a submerged state, operation means for operating at the time of photographing that emits sound or visible light at the time of photographing using the camera, and control means for controlling an operation of the operation means for operating at the time of photographing, the portable electronic device being characterized in that:

when the submergence detecting means detects at said time of photographing using the camera that the housing is in the submerged state, the control means switches said operation means from a normal operation in a non-submerged state to a non-normal operation for notifying people around of the photographing in the submerged state, by causing said operation means to emit sound or visible light.

* * * * *